United States Patent

Holstad

[11] 3,859,987
[45] Jan. 14, 1975

[54] MIRROR, PARTICULARLY FOR EXAMINATION OF CAVITIES, FOR EXAMPLE, SURGICAL MIRRORS OR DENTAL MIRRORS

[76] Inventor: Harald Holstad, Bragernes torv 2a, 3000, Drammen, Norway

[22] Filed: Apr. 13, 1973

[21] Appl. No.: 350,990

[30] Foreign Application Priority Data
Apr. 17, 1972 Norway.............................. 1320/72

[52] U.S. Cl..................................... 128/21, 32/69
[51] Int. Cl............................................... A61b 1/00
[58] Field of Search........................... 128/21; 32/69

[56] References Cited
UNITED STATES PATENTS
2,228,169  1/1941  Keogh, Jr. et al. ..................... 32/69
2,948,912  8/1960  Wisdom.............................. 32/69 X
3,091,034  5/1963  Piscitelli................................. 32/69

FOREIGN PATENTS OR APPLICATIONS
1,288,742  2/1969  Germany .............................. 128/21

Primary Examiner—Lucie H. Laudenslager
Attorney, Agent, or Firm—Cushman, Darby & Cushman

[57] ABSTRACT

A mirror, particularly for examination of cavities, for example, a surgical mirror or dental mirror, having a mirror element mounted in a holder being connected to a hollow handle, the surface of the mirror being provided with a plurality of small apertures through which a gaseous medium, supplied externally through the hollow handle, can be blown. A vane member may be rotatably mounted centrally in the mirror and on the mirror surface, the vane member being adapted to rotate above the mirror surface under the action of the gaseous medium.

6 Claims, 7 Drawing Figures

PATENTED JAN 14 1975    3,859,987

MIRROR, PARTICULARLY FOR EXAMINATION OF CAVITIES, FOR EXAMPLE, SURGICAL MIRRORS OR DENTAL MIRRORS

The present invention relates to a mirror, particularly for examination of cavities, for example, a surgical mirror or a dental mirror, having a mirror element mounted in a holder the holder being connected to a hollow handle.

The object of the invention is to eliminate the disadvantages arising when the surface of the mirror, during use, becomes coated with moisture or loose particles.

It is previously known to blow air onto the mirror by arranging a nozzle adjacent to, and at an angle to, the mirror. Only dry dust can be removed by this arrangement, however. As soon as the mirror becomes moist from water or saliva, it must be cleaned in the usual manner, since the air jets cannot effectively remove the moisture adequately to give a clear mirror image.

In recent dental drilling technique, the drilling apparatus is sprayed with a cooling water jet, and it is then particularly difficult to view the working location by means of a mirror since the water is sprayed very finely throughout the entire mouth cavity and immediately coats the mirror.

Mirrors are also known where the mirror is rotatably mounted in a holder and is rotated at a relatively high speed. The object of this embodiment is to remove both water and drilling dust and other particles immediately from the mirror by the centrifugal action so that the mirror retains a clear mirror image. In practice it proves that this embodiment is not entirely satisfactory.

In accordance with the invention a mirror is provided where a gaseous medium is used to keep the mirror clean. The gaseous medium may be air or another suitable gas.

According to the invention, the mirror element is provided with several small apertures through which a gaseous medium, supplied through the hollow holder, is blown. In this manner, a strong turbulent zone is provided directly above the surface of the mirror and this contributes to keeping the surface of the mirror clean.

In accordance with the invention, a vane element may expediently be rotatably mounted at the centre of the mirror face, said vane member being rotatable above the mirror face under the action of the gaseous medium flowing through the hollow handle and out through the said small apertures in the mirror surface. A powerful turbulent effect is achieved by this embodiment which effectively removes water, saliva and other impurities.

The vane element may, in accordance with the invention, be in the form of a turbine operated by the gaseous medium, and may, for example, be formed as a propeller operated by the gas flow, or the vane element may be formed as a reaction turbine, f.i., a so-called Segner-reaction-wheel. The vane element may also be connected to a turbine arranged within the holder, said turbine being operated by the gaseous medium.

The invention is further explained with reference to the drawings where

Figure 3:
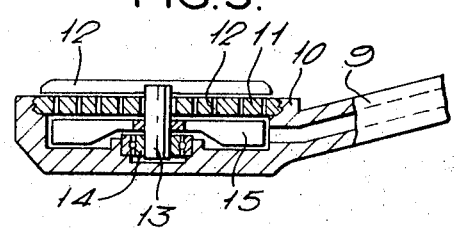
FIG. 3 is a section through a second embodiment.
Figure 4:
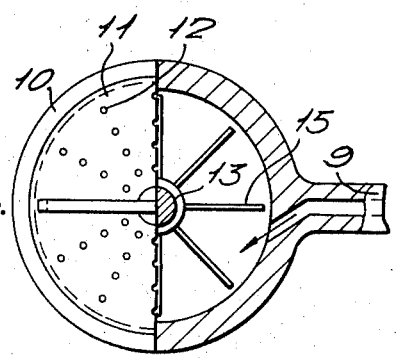

FIG. 4 showing a partially bisected horizontal elevation of the embodiment according to FIG. 3.

Figure 5:
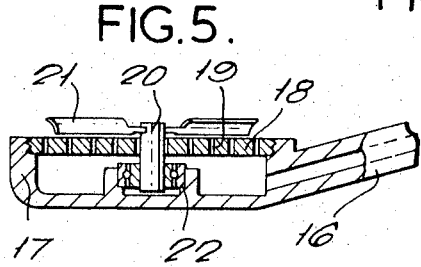
Figure 6:
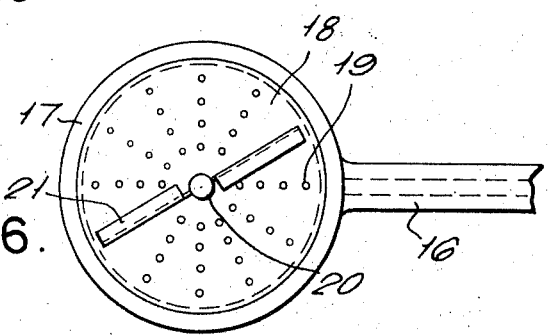

FIGS. 5 and 6 illustrate, in the same manner, a section and a horizontal projection of a third embodiment example.

Figure 7:
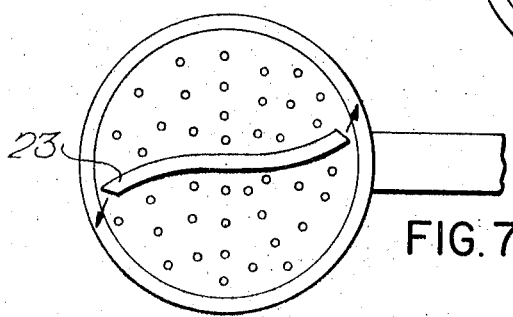

FIG. 7 illustrates a horizontal projection of a fourth embodiment.

Figure 1:
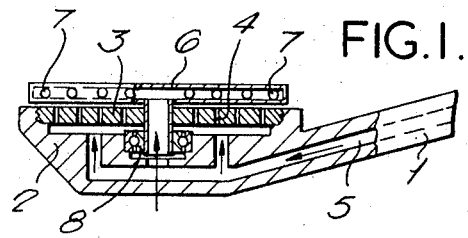
FIG. 1 illustrates a side view of the mirror according to the invention, partially in section.

In FIG. 1, a dental mirror is illustrated which, in this case, consists of hollow handle 1 which is connected to a holder 2. In the holder, a mirror 3 is arranged, and the mirror is provided with a plurality of small apertures 4. Gaseous medium passing through the bore 5 in the handle 1 enters the holder 2 and passes through the small apertures 4 in the mirror surface 3.

Figure 2:
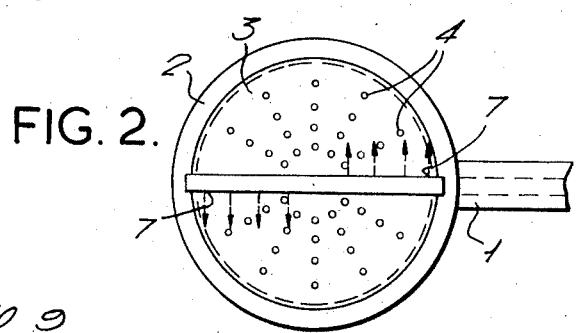
FIG. 2 is a horizontal projection of the mirror in FIG. 1.

A reaction turbine 6 is centrally mounted in the mirror in this case, in the form of a tube with a central branch whereby the tube is mounted in the holder, more specifically in the ball bearings 8 illustrated. The tube 6 is provided with small apertures 7, such that when the gaseous medium enters the tube 6, as indicated by the arrows in FIG. 1, the gaseous medium flows out through the apertures 7 (see arrows in FIG. 2), and the tube 6 then acts as a reaction turbine and rotates, as the gaseous medium flows through the small apertures 4.

FIGS. 3 and 4 illustrate an embodiment where, on a hollow handle 9, a holder 10 for a mirror 11 is mounted, said mirror being provided with small apertures 12 corresponding to the apertures 4 in the first embodiment example. A vane member 12 is mounted centrally in the mirror surface 11 by means of an axial pin 13 which passes into the holder and is mounted there by means of ball bearings 14 illustrated. The axial pin 13 is power-connected to a blade turbine 15 operated by the gaseous medium which passes through the hollow handle 9. When the gaseous medium flows in through the hollow handle 9, the turbine 15 is started and the vane element 12 is then operated by the gaseous medium via the turbine 15. At the same time, the gaseous medium flows through the small apertures 12.

The embodiment example in FIGS. 5 and 6 is provided with a hollow handle 16 connected to a holder 17. The holder supports a mirror 18 provided with small apertures 19. An axial pin 20 is arranged centrally in the mirror surface 18 and is rigidly connected to a vane member 21. The axial pin is rotatably mounted in the holder 17 by means of the ball bearing 22 illustrated. The vane member 21 is formed such that it is rotated by the gas flow arising from the apertures 19. The gaseous medium which flows in through the hollow handle 16 passes out through the apertures 19 and, at the same time, sets the vane member 21 in rotation by reason of the fact that these are shaped such that the gaseous medium strikes the vanes and sets the vane member in rotation.

In FIG. 7 the rotating element 23 is in the form of a tube curved as an S and open in both ends. This embodiment is a modification of the embodiment in FIGS. 1 and 2 and for further details reference is made to the description of that embodiment.

Having described my invention, I claim:

1. A self-cleaning surgical or dental mirror for examination of cavities comprising a mirror element arranged in a holder which is connected to a hollow handle, the surface of said mirror element being provided with a means for keeping said surface clean, said means including a plurality of apertures through which a gaseous medium supplied externally through said hollow handle can be blown.

2. A self-cleaning surgical or dental mirror for examination of cavities comprising a mirror element arranged in a holder which is connected to a hollow handle, the surface of said mirror element being provided with a plurality of apertures through which a gaseous medium supplied externally through said hollow handle can be blown, wherein a vane member is rotatably mounted centrally in said mirror element and on said mirror surface, said vane member being adapted to rotate above said mirror surface under action of the gaseous medium.

3. Mirror according to claim 2, wherein said vane member is formed as a turbine operated by the gaseous medium.

4. Mirror according to claim 3, wherein said vane member is formed as a reaction turbine.

5. Mirror according to claim 4, wherein said vane member is formed as a centrally rotatably mounted S-formed, and in both ends, open tube.

6. Mirror according to claim 2, wherein said vane member is connected to a turbine arranged within the holder and operated by the gaseous medium.

* * * * *